Sept. 23, 1930.                M. K. SMITH                1,776,641
                                 HUB CAP
                              Filed Jan. 2, 1930
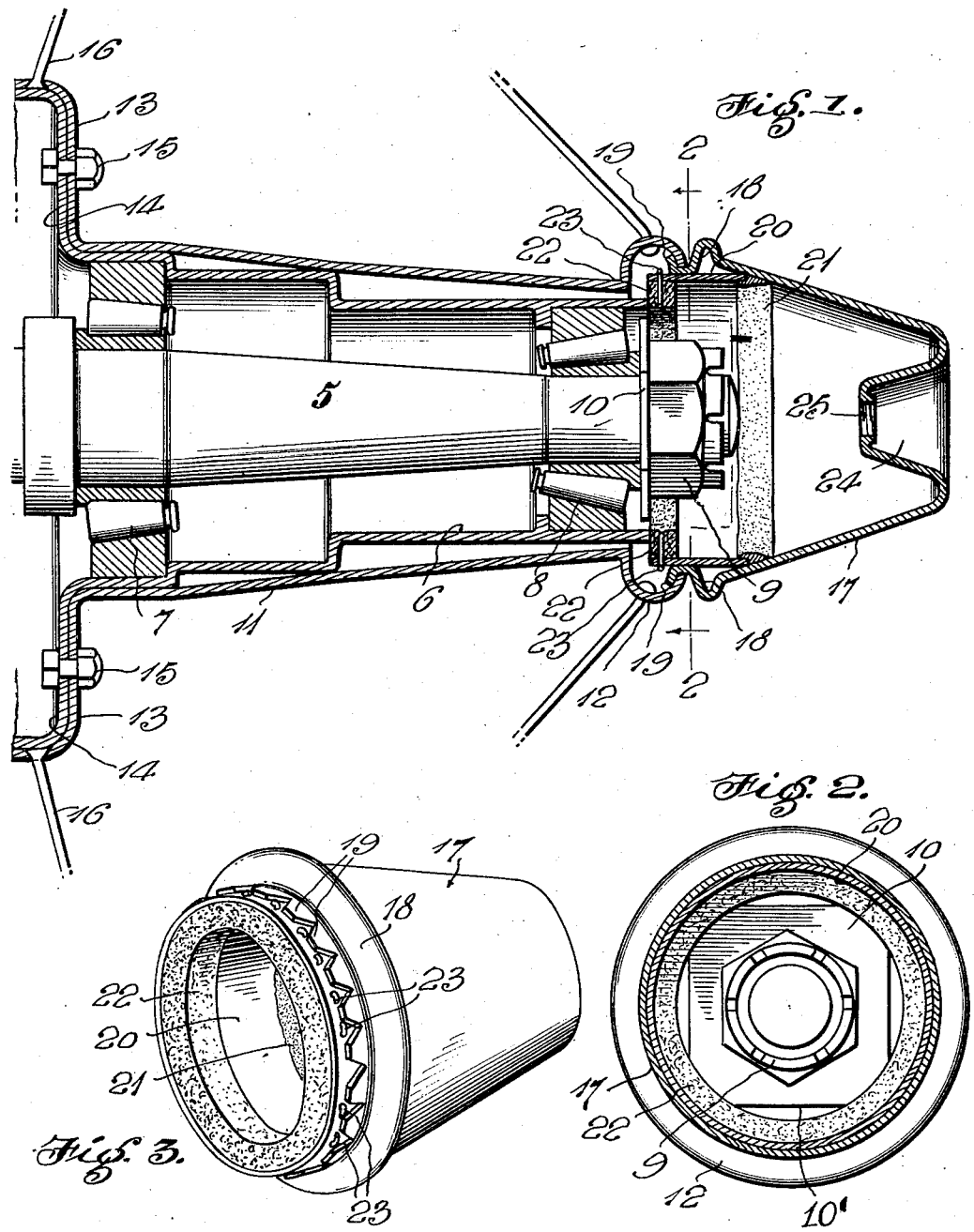
INVENTOR
M. K. Smith
BY
        ATTORNEY Patented Sept. 23, 1930

1,776,641

UNITED STATES PATENT OFFICE

MODDIE K. SMITH, OF LULING, TEXAS

HUB CAP

Application filed January 2, 1930. Serial No. 418,071.

My invention relates to improvements in hub caps.

As is well known, the modern wire automobile wheel, such as used upon the model A Ford automobile and others, embodies an inner hub shell which is rotatably mounted upon a spindle, and a wheel hub shell is bolted to the inner hub shell and is removable therefrom. The wheel hub shell, spokes and rim constitute a removable unit.

In accordance with the present invention, I provide a hub cap which is adapted to be permanently attached to the outer end of the wheel hub shell. The attachment is effected by means to be described.

The invention serves as a hub cap, grease retainer and dust cap.

In the accompanying drawings, forming a part of this specification, and in which like numerals are employed to designate like parts throughout the same, Figure 1 is a central vertical longitudinal section through a device embodying my invention, Figure 2 is a transverse section taken on line 2—2 of Figure 1, and, Figure 3 is a perspective view of the grease cup.

In the drawings, wherein for the purpose of illustration, is shown a preferred embodiment of my invention, the numeral 5 designates a spindle upon which the wheel is rotatably mounted.

The wheel embodies an inner hub shell 6, having bearings 7 and 8 arranged between the hub shell and spindle. The hub shell is retained in place upon the spindle by means of a nut 9, held against accidental rotation by any suitable means, and this nut engages a washer 10, at its inner end. This washer snugly engages within the outer end of the inner hub shell 6 and has its edges cut away on four sides, providing passages 10', to permit grease or other lubricant to pass through the same, and enter the inner hub shell, in suitable amounts.

The numeral 11 designates the wheel hub shell, provided at its outer end with an outwardly bulging hollow flange 12, which is U-shaped in cross section, and at its inner end with a radial attaching flange 13, to be rigidly and detachably secured to the radial flange 14 of the inner hub shell 6, by means of bolts 15, or the like. The spokes 16 of the wheel are secured to the outer flange 12 and the inner flange 13, by any suitable means and these spokes carry the usual rim, not shown. The wheel hub shell 11, spokes 16, and the rim constitute the removable unit of the wheel.

The numeral 17 designates a hub cap shell which is preferably tapered and decreases in diameter outwardly. This hub cap shell is of a sufficient size to carry a suitable amount of grease or other lubricant. This hub cap shell is provided at its inner end with an outwardly bent annular flange 18, upon the inner end of which are formed originally straight attaching teeth or segments 19, which extend parallel with the longitudinal axis of the grease cup shell. Disposed within the inner portion of the grease cup shell 17 is an annular band or ring 20, the outer end of which is rigidly attached to the grease cup shell 17 by solder 21 or the like, and forms a gas-tight joint therewith. The ring 20 extends beyond the teeth 19 and a packing ring 22 is arranged within the inner end of the annular band 20 and is attached thereto by wire stitching 23, extending through apertures in the annular band 20. The packing ring 22 may be secured to the annular band 20 by other suitable means. This packing ring may be formed of leather, felt, or any other suitable material. At its outer end, the hub cap shell 17 is provided with an inwardly projecting tubular coupling 24, having a screw-threaded opening 25, to receive the screw-threaded stem of a grease cup or cup containing any suitable lubricant. The opening 25 may be closed by any suitable means, such as a plug.

In assembling the grease cup shell 17 upon the wheel hub shell 11, the wheel hub shell is separated from the inner hub shell 6, and the annular set of teeth 19 are inserted within the outer end of the flange 12. By means of a suitable tool, which may be passed through the inner end of the wheel hub shell 11, the teeth 19 are bent outwardly, to interlock with the hollow flange 12, as clearly shown in Figure 1, and the hub cap shell 17 is then permanently secured to the wheel hub shell 11. When the wheel hub 11 is returned in place upon the inner hub shell 6, the packing ring 22 is brought into firm engagemnet with the outer end of the inner hub shell 6 and a dust-tight joint provided, preventing dust from entering the inner hub shell 6. The lubricant is now fed into the hub cap shell 17 through the opening 25 by means of the grease cup carried thereby. The shell 17 not only serves as a grease cup, but as a means to exclude dust from the interior of the inner hub shell and also as means for holding a relatively large amount of lubricant which is supplied to the bearings by passing about the washer 10.

It is to be understood that the form of my invention, herewith shown and described, is to be taken as a preferred example of the same, and that various changes in the shape, size and arrangement of parts, may be resorted to without departing from the spirit of my invention, or the scope of the subjoined claims.

Having thus described my invention, I claim:—

1. The combination with the inner hub shell of a wheel, of a wheel hub shell removably mounted upon the inner hub shell and provided at its outer end with a flange, a grease cup shell having one end inserted within said flange and provided with teeth adapted to be bent into interlocking engagement with the flange so that the grease cup shell is permanently secured to the wheel hub shell, an annular band secured within the grease cup shell, and a packing ring carried by the band and arranged to engage with the outer end of the inner hub shell for forming a dust-proof joint with the same.

2. The combination with a spindle, of an inner hub shell mounted upon the same, a nut carried by the spindle, a washer arranged behind the nut and arranged at the outer end of the inner hub shell and having a smaller diameter than the same to provide a clearance for the passage of a lubricant, a wheel hub shell removably mounted upon the inner hub shell and provided at its outer end with an outwardly bulging flange having an inturned lip, a grease cup shell having one end inserted within the flange and provided in such end with originally approximately straight teeth adapted to be bent outwardly into interlocking engagement with the lip of the flange so that the grease cup shell is permanently secured to the wheel hub shell, an annular band arranged within the grease cup shell and having a dust-proof joint with the same and projecting beyond the inner end of the same, a packing ring carried by the inner end of the band and engaging the outer end of the inner hub shell to form a dust-proof joint, said grease cup shell having an opening for receiving the stem of a grease cup or the like.

3. A grease cup shell provided at its inner end with teeth adapted to be inserted within the outer end of a wheel hub shell and to be bent laterally for interlocking engagement therewith, an annular band arranged within the grease cup shell and having a dust-tight joint with the same, and a packing ring carried by the band and arranged to engage with the end of an inner hub shell upon which the wheel hub shell is removably mounted.

In testimony whereof I affix my signature.

MODDIE K. SMITH.